United States Patent
Hyun et al.

(10) Patent No.: US 10,792,811 B2
(45) Date of Patent: Oct. 6, 2020

(54) MULTI-BAR LINKAGE, LOWER-LIMB EXOSKELETON ROBOT USING THE SAME, AND METHOD OF CONTROLLING THE SAME

(71) Applicants: Hyundai Motor Company, Seoul (KR); Kia Motors Corporation, Seoul (KR); Hyundai Rotem Company, Changwon, Gyeongsangnam-do (KR)

(72) Inventors: Dong Jin Hyun, Gyeonggi-do (KR); Tae Jun Ha, Gyeonggi-do (KR); Hyun Seok Park, Gyeonggi-do (KR)

(73) Assignees: Hyundai Motor Company, Seoul (KR); Kia Motors Corporation, Seoul (KR); Hyundai Rotem Company, Changwon, Gyeongsangnam-do (KR)

( * ) Notice: Subject to any disclaimer, the term of this patent is extended or adjusted under 35 U.S.C. 154(b) by 373 days.

(21) Appl. No.: 15/824,532

(22) Filed: Nov. 28, 2017

(65) Prior Publication Data
US 2019/0001493 A1 Jan. 3, 2019

(30) Foreign Application Priority Data
Jun. 30, 2017 (KR) .......................... 10-2017-0083297

(51) Int. Cl.
*B25J 9/00* (2006.01)
*B25J 9/16* (2006.01)
*B25J 9/10* (2006.01)

(52) U.S. Cl.
CPC ............ *B25J 9/1633* (2013.01); *B25J 9/0006* (2013.01); *B25J 9/1065* (2013.01); *B25J 9/1638* (2013.01)

(58) Field of Classification Search
CPC ...... B25J 9/1633; B25J 9/1065; B25J 9/1638; B25J 9/0006
See application file for complete search history.

(56) References Cited

U.S. PATENT DOCUMENTS 9,618,937 B1 * 4/2017 Blankespoor .......... G05D 1/021
10,279,898 B2 * 5/2019 Green ..................... B64C 27/32
(Continued)

FOREIGN PATENT DOCUMENTS

JP 2013-138784 A 7/2013
KR 2009-0126690 A 12/2009

OTHER PUBLICATIONS

JP2013-138784 JPO English Translation (Year: 2013).*

*Primary Examiner* — Ian Jen
(74) *Attorney, Agent, or Firm* — Mintz Levin Cohn Ferris Glovsky and Popeo, P.C.; Peter F. Corless

(57) ABSTRACT

A multi-bar linkage includes a driving unit that is configured to supply torque to a driving shaft, where the driving shaft is provided on a first portion of a first link. A driving arm has one end fixed to the driving shaft and an opposite end being movable following rotation of the driving shaft. A first auxiliary link has one end pivotably connected to the opposite end of the driving arm. A second auxiliary link is pivotably connected to a first point of a second portion of the first link and to an opposite end of the first auxiliary link. A second link is disposed below the first link and pivotably connected to the second auxiliary link. A third auxiliary link has one end pivotably connected to a second point of the second portion of the first link, separated from the first point, and an opposite end pivotably connected to the second link.

11 Claims, 9 Drawing Sheets

(56) References Cited

U.S. PATENT DOCUMENTS

| | | | |
|---|---|---|---|
| 2011/0301756 A1* | 12/2011 | Yoshiike | B62D 57/032 |
| | | | 700/253 |
| 2013/0150980 A1* | 6/2013 | Swift | A61F 2/68 |
| | | | 623/24 |
| 2015/0127018 A1* | 5/2015 | Lim | A61H 1/024 |
| | | | 606/130 |
| 2015/0321340 A1 | 11/2015 | Smith | |

* cited by examiner

MULTI-BAR LINKAGE, LOWER-LIMB EXOSKELETON ROBOT USING THE SAME, AND METHOD OF CONTROLLING THE SAME

CROSS REFERENCE TO RELATED APPLICATION

The present application claims under 35 U.S.C. § 119(a) the benefit of Korean Patent Application No. 10-2017-0083297, filed Jun. 30, 2017, the entire contents of which are incorporated by reference herein.

BACKGROUND

1. Technical Field

The present disclosure generally relates to a multi-bar linkage, a lower-limb exoskeleton robot using the same, and a method of controlling the same, more particularly, to a multi-bar linkage that can adjust the center of rotation of a knee in accordance with the angle of rotation by imitating the operating mechanism of a human knee, a lower-limb exoskeleton robot using the same, and a method of controlling the same.

2. Description of the Related Art

Exoskeleton technology is provided, in particular, for helping disabled and elderly persons to move. However, exoskeleton robots still have a variety of engineering issues regarding the mechanical design and operation algorithm thereof. For example, spaces or weights allowable to mechanical components of an exoskeleton robot are critically limited, so that the exoskeleton robot can be worn like a piece of clothing. In addition, the overall control sampling speeds of exoskeleton robots must be rapid to provide a proper response to external force acting from the surrounding environment without limiting the mobility of users.

Although to date many robot developers have introduced wearable robots, significant improvements in the control algorithm of wearable robots are still required.

In particular, in the case of a knee joint of an exoskeleton robot, a driving unit, such as an actuator, is provided in a position corresponding to the knee joint, such that the knee rotates on a single fixed axis of rotation. However, a knee joint of a human body performs polycentric rotation due to the center of rotation being variable during rotation, and in the related art, exoskeleton robots fail to accurately imitate the rotation of the knee of users.

Thus, conventional exoskeleton robots are uncomfortable to wear and may fail to rapidly respond to the movement of the human body, which can be problematic.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a multi-bar linkage that can adjust the center of rotation of a knee in accordance with the angle of rotation by imitating the operating mechanism of human knees, a lower-limb exoskeleton robot using the same, and a method of controlling the same.

In order to achieve the above object, according to an aspect of the present disclosure, a multi-bar linkage may include: a driving unit supplying torque to a driving shaft; a first link, wherein the driving shaft is provided on a first portion of the first link; a driving arm having one side fixed to the driving shaft and an opposite side being movable following rotation of the driving shaft; a first auxiliary link having one side pivotably connected to the opposite side of the driving arm; a second auxiliary link pivotably connected to a first point of a second portion of the first link and pivotably connected to an opposite side of the first auxiliary link; a second link disposed below the first link and pivotably connected to the second auxiliary link; and a third auxiliary link having one side pivotably connected to a second point of the second portion of the first link, separated from the first point of the second portion of the first link, and an opposite side pivotably connected to the second link.

According to an exemplary embodiment, the second auxiliary link may have a contact surface, with which a lower side portion of the first link comes into contact, and the lower side portion of the first link may slide on the contact surface when the driving shaft rotates.

According to an exemplary embodiment, the lower portion of the first link may include a curved surface, and the contact surface may include a surface concavely curved in a direction of the first link.

According to an exemplary embodiment, the second auxiliary link may include a guide forming the contact surface and a connecting portion fixed to one side of the guide. The connecting portion may be pivotably connected to the first link and the first auxiliary link, and an opposite side of the guide may be pivotably connected to the second link.

According to an exemplary embodiment, the guide may include roller bearings on the contact surface.

According to an exemplary embodiment, the multi-bar linkage may further include a controller controlling the driving unit by determining torque of the driving shaft based on an angle of rotation detected from the driving arm.

According to an aspect of the present disclosure, the controller may perform: detecting the angle of rotation of the driving arm; deriving an angle of a knee joint, as an angle between the first link and the second link corresponding to the detected angle of rotation of the driving arm, and a ratio between an angular speed of the knee joint and an angular speed of rotation of the driving arm, by applying a preset mapping function and a preset speed ratio, and deriving an angular speed of rotation of the driving art by differentiating the detected angle of rotation of the driving arm; deriving an angular speed of the knee joint corresponding to the detected angle of rotation of the driving arm, using the ratio between the detected angular speed of rotation of the driving arm and the ratio between the angular speed of the knee joint and the angular speed of rotation of the driving arm; deriving torque of the knee joint, as a torque of rotation of the second link based on the first link, using the derived angle of the knee joint and the derived angular speed of the knee joint; and determining the torque of the driving shaft, using the derived ratio between the angular speed of the knee joint and the angular speed of rotation of the driving arm and the derived torque of the knee joint, and driving the driving unit to output the determined torque of the driving shaft.

According to an exemplary embodiment, the mapping function may be predetermined by a formula:

$$\theta_k = f(\theta_a)$$

where $\theta_a$ is the angle of rotation of the driving arm, and Ok is the angle of the knee joint.

The ratio between the angular speed of the knee joint and the angular speed of rotation of the driving arm may be predetermined by differentiating and arranging both sides of the formula of the mapping function with respect to time so as to be expressed by a formula:

$$\frac{\dot{\theta}_k}{\dot{\theta}_a} = \frac{df(\theta_a)}{d\theta_a}.$$

According to an exemplary embodiment, the controller may determine the torque of the driving shaft by a torque calculation formula:

$$\tau_a = \frac{\dot{\theta}_k}{\dot{\theta}_a}\tau_k = \frac{df(\theta_a)}{d\theta_a}\tau_k.$$

The torque calculation formula may be determined, on an assumption that energy of the driving shaft is preserved as energy of rotation of the second link, by establishing an energy preservation formula:

$$\tau_k\dot{\theta}_k = \tau_a\dot{\theta}_a,$$

where $\tau_k$ is the torque of the knee joint, $\tau_a$ is the torque of the driving shaft, $\dot{\theta}_k$ is the angular speed of the knee joint, and $\dot{\theta}_a$ is the angular speed of the driving arm, and dividing both sides of the energy preservation formula by the angular speed of the driving arm.

According to an aspect of the present disclosure, provided is a method of controlling the above-described multi-bar linkage. The method may include: detecting the angle of rotation of the driving arm; deriving an angle of a knee joint corresponding to the detected angle of rotation of the driving arm, as an angle between the first link and the second link corresponding to the detected angle of rotation of the driving arm, and a ratio between an angular speed of the knee joint and an angular speed of rotation of the driving arm, by applying a preset mapping function and a preset speed ratio, and deriving an angular speed of rotation of the driving art by differentiating the detected angle of rotation of the driving arm; deriving an angular speed of the knee joint corresponding to the detected angle of rotation of the driving arm, using the derived ratio between the detected angular speed of rotation of the driving arm and the ratio between the angular speed of the knee joint and the angular speed of rotation of the driving arm; deriving torque of the knee joint, as a torque of rotation of the second link based on the first link, using the derived angle of the knee joint and the derived angular speed of the knee joint; and determining the torque of the driving shaft, using the derived ratio between the angular speed of the knee joint and the angular speed of rotation of the driving arm and the derived torque of the knee joint, and driving the driving unit to output the determined torque of the driving shaft.

According to the multi-bar linkage, the lower-limb exoskeleton robot using the same, and the method of controlling the same, as described above, the knee joint can perform a polycentric rotation as in real human bodies, so that a leg movement very similar to the movement of the leg of the user can be performed. It is possible to remove the problem in that cuffs, disposed on the thigh, shin, and the like of the user to bring the robot into close contact with the user, are pushed, thereby making the exoskeleton robot more comfortable to wear.

In addition, the lower-limb exoskeleton robot according to a plurality of embodiments of the present disclosure can realize intrinsic stability to resist a ground reaction torque transferred through a sole when a heel touches the ground or a floor by temporarily changing the center of rotation during the rotation of the knee.

Furthermore, the lower-limb exoskeleton robot according to a plurality of embodiments of the present disclosure can displace the position of the driving unit, such as a motor or an actuator, to a location above the thigh link to reduce the moment of inertia of the leg of the exoskeleton robot. This can increase the mechanical bandwidth of the leg of the robot to be suitable for walking at a relatively high speed. In addition, a changeable torque ratio between the driving unit (shaft) and the knee joint allows the leg to support a load when extended and to rapidly swing when flexed.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
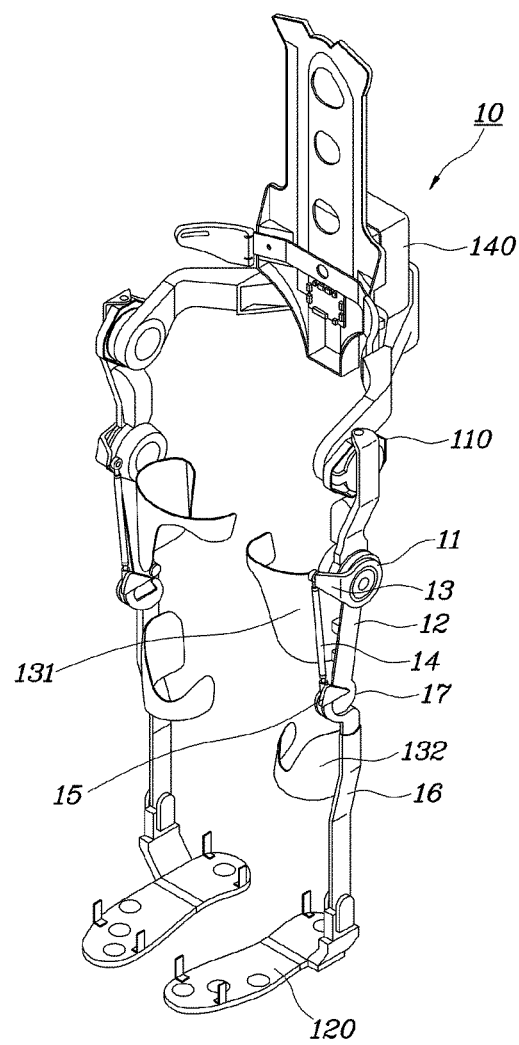
FIG. 1 is a perspective view illustrating the outline of a lower-limb exoskeleton robot according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a multi-bar linkage, a lower-limb exoskeleton robot using the same, and a method of controlling the same according to various exemplary embodiments of the present disclosure will be described in detail with reference to the accompanying drawings. Throughout the drawings, the same reference numerals will refer to the same or like parts.

Figure 2:
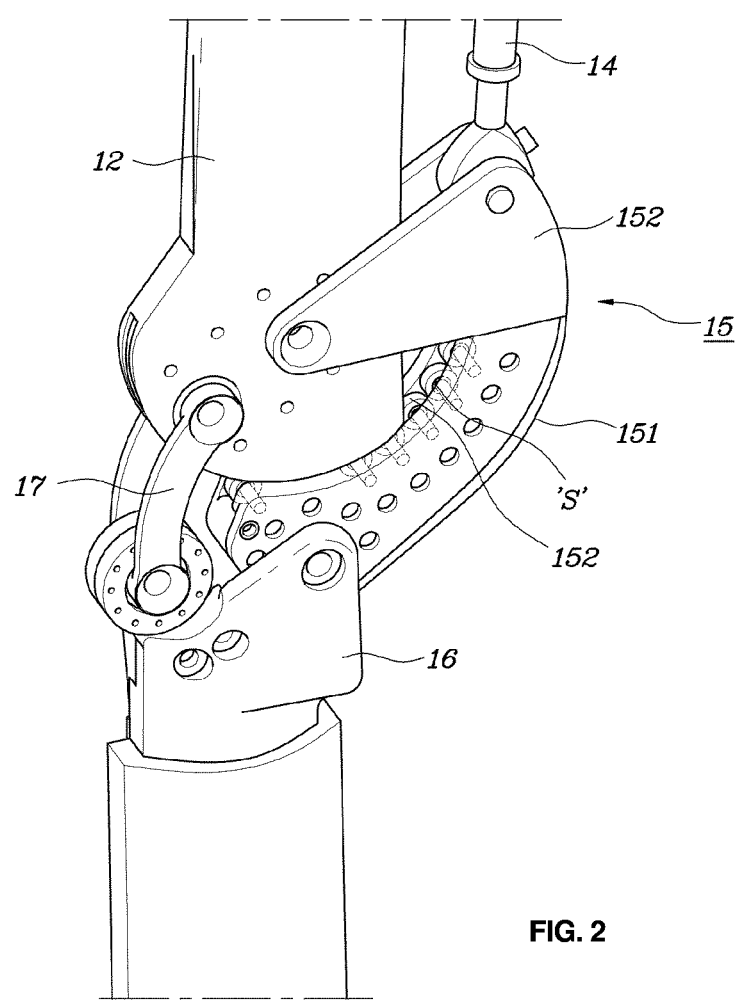
FIG. 2 is an enlarged perspective view of a knee joint of the lower-limb exoskeleton robot illustrated in FIG. 1.
Figure 3:
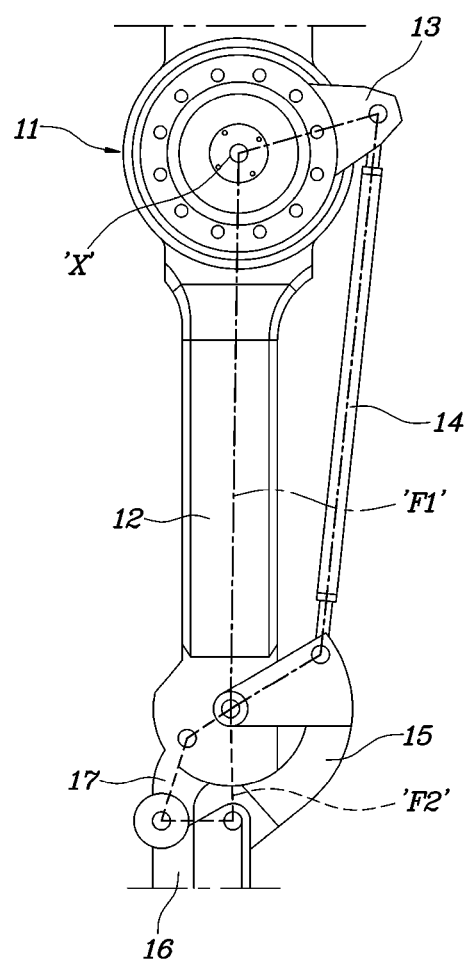
FIG. 3 is an enlarged plan view of the knee joint of the lower-limb exoskeleton robot illustrated in FIG. 1.

FIG. 1 is a perspective view illustrating the outline of a lower-limb exoskeleton robot according to an embodiment of the present disclosure, FIG. 2 is an enlarged perspective view of the knee joint of the lower-limb exoskeleton robot illustrated in FIG. 1, and FIG. 3 is an enlarged plan view of the knee joint of the lower-limb exoskeleton robot illustrated in FIG. 1.

Referring to FIGS. 1 to 3, the lower-limb exoskeleton robot 10 according to an embodiment of the present disclosure is embodied as a multi-bar linkage. More specifically, the lower-limb exoskeleton robot 10 according to an embodiment of the present disclosure includes a thigh link 12, a driving arm 13, a first auxiliary link 14, a second auxiliary link 15, a shank link 16, and a third auxiliary link 17. Those skilled in the art may easily understand and carry out the multi-bar linkage according to the present disclosure from the following description of the configuration, operation, and effects of the lower-limb exoskeleton robot 10 according to an embodiment of the present disclosure.

A driving unit 11 is located on the upper portion of the thigh link 12. The driving unit 11 may include a motor or an actuator configured to provide torque to a driving shaft X, and a reducing/accelerating device coupled to the motor or actuator. The driving shaft X is oriented in the lateral direction of the thigh link 12.

One side of the driving arm 13 is fixed to the driving shaft X that is rotated by the driving unit 11, such that an opposite side of the driving arm 13 can move following the rotation of the driving shaft X. As the driving shaft X is oriented in the lateral direction of the thigh link 12, and one side of the driving arm 13 is connected to the driving shaft, the driving arm 13 can operate such that the opposite side thereof moves up and down on the front portion of the thigh link 12.

One side of the first auxiliary link 14 is pivotably connected to the opposite side of the driving arm 13. In particular, one side of the first auxiliary link 14 can be connected to the opposite side of the driving arm 13 such that one side of the first auxiliary link 14 can freely pivot.

The second auxiliary link 15 has a total of three contact points. At one of the contact points, the second auxiliary link 15 is freely pivotably connected to the first auxiliary link 14. At one of the remaining two contact points, the second auxiliary link 15 is freely pivotably connected to the lower portion of the thigh link 12.

The thigh link 12, the driving arm 13, the first auxiliary link 14, and the second auxiliary link 15, as described above, are connected to each other such that adjacent components can pivot with respect to each other, thereby constituting a single four-bar linkage F1.

The shank link 16 is disposed below the thigh link 12, and is freely pivotably connected to one contact point of the three contact points of the second auxiliary link 15, except for the two contact points connected to the first auxiliary link 14 and the thigh link 12.

One side of the third auxiliary link 17 is freely pivotably connected to the lower portion of the thigh link 12, and an opposite side of the third auxiliary link 17 is freely pivotably connected to the shank link 16.

The thigh link 12, the second auxiliary link 15, the shank link 16, and third auxiliary link 17, as described above, are connected to each other such that adjacent components can pivot with respect to each other, thereby constituting another single four-bar linkage F2.

For the sake of brevity, the four-bar linkage, made up of the thigh link 12, the driving arm 13, the first auxiliary link 14, and the second auxiliary link 15, will be referred to as a first four-bar linkage F1, while the four-bar linkage, made up of the thigh link 12, the second auxiliary link 15, the shank link 16, and the third auxiliary link 17, will be referred to as a second four-bar linkage F2.

The first four-bar linkage F1 and the second four-bar linkage F2 share one contact portion on the lower portion of the thigh link 12 via the second auxiliary link 15. The second auxiliary link 15, which has three contact points at fixed positions, acts as a bar of the first four-bar linkage F1 while acting as a bar of the second four-bar linkage F2, such that movement caused by the rotation of the driving shaft X is delivered to the shank link 16. When the movement caused by the rotation of the driving shaft X is delivered to the shank link 16, the structure of the second four-bar linkage F2 is varied to change the angle between the thigh link 12 and the shank link 16, so that a knee movement can be realized by the exoskeleton robot.

The second auxiliary link 15 includes a guide 151 having a contact surface S, such that the lower portion of the thigh link 12 comes into contact and slides on the contact surface S of the second auxiliary link 15. The lower portion of the thigh link 12 is configured to have a convexly curved surface, and the contact surface of the guide 151 is concavely curved in the direction of the thigh link 12, such that the curved surface of the lower portion of the thigh link 12 can come into contact with and slide on the contact surface of the guide 151.

A plurality of roller bearings 153 are disposed on the contact surface S of the guide 151 to reduce friction and a weight load in the process in which the lower portion of the thigh link 12 slides along the contact surface S.

One side of the guide 151 is directly and freely pivotably connected to the shank link 16. A coupling portion 152 is fixed to an opposite side of the guide 151. Different contact points of the coupling portion 152 are freely pivotably connected to the thigh link 12 and the first auxiliary link 14.

In addition, as illustrated in FIG. 1, the lower-limb exoskeleton robot according to an embodiment of the present disclosure further includes: a hip joint driving unit 110 connected to the thigh link 12; a foot portion 120 supporting a foot of the user, the foot portion 120 determining whether the user's foot is placed on or raised from the ground; cuffs 131 and 132 fixing corresponding links to the thigh and shank of the user; and a controller 140 controlling the driving units 11 and 110.

Hereinafter, an operating mechanism and control method of the lower-limb exoskeleton robot according to an embodiment of the present disclosure, having the previously-described configuration, will be described in more detail.

Figure 4:
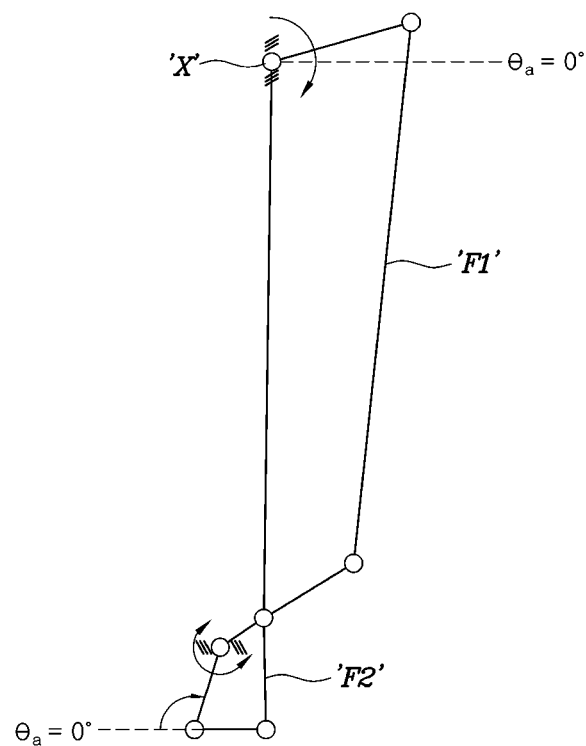
FIG. 4 is a conceptual view illustrating two four-bar linkages provided in a knee joint part of the lower-limb exoskeleton robot illustrated in FIG. 1.
Figure 5:
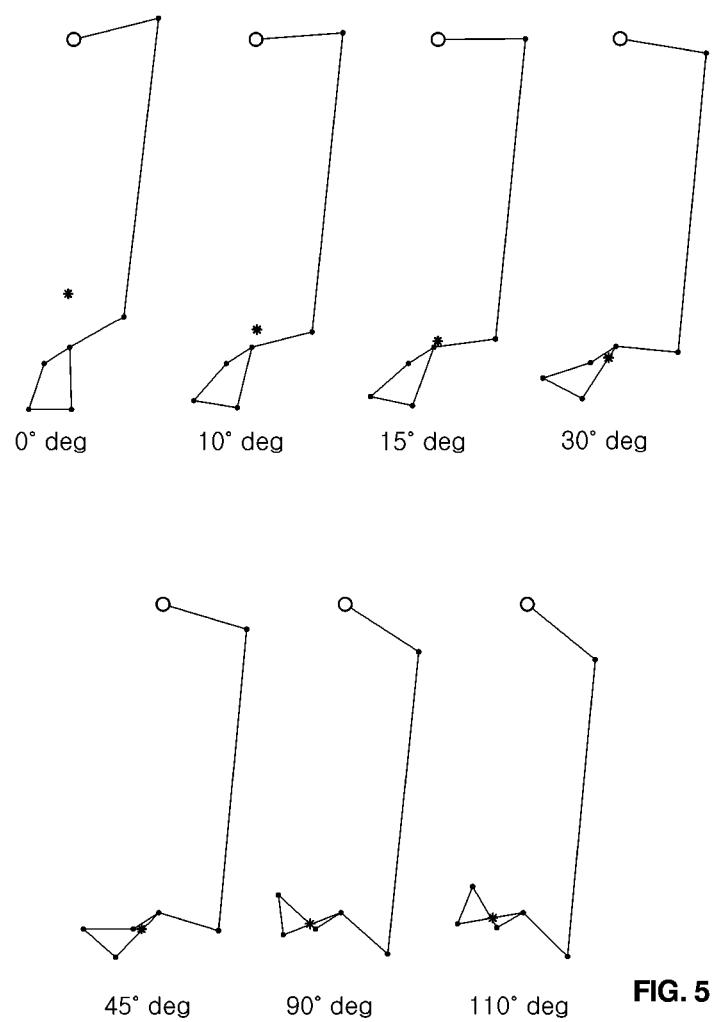
FIG. 5 sequentially illustrates the operation of the four-bar linkages illustrated in FIG. 4, according to the angles of the knee.
Figure 6:
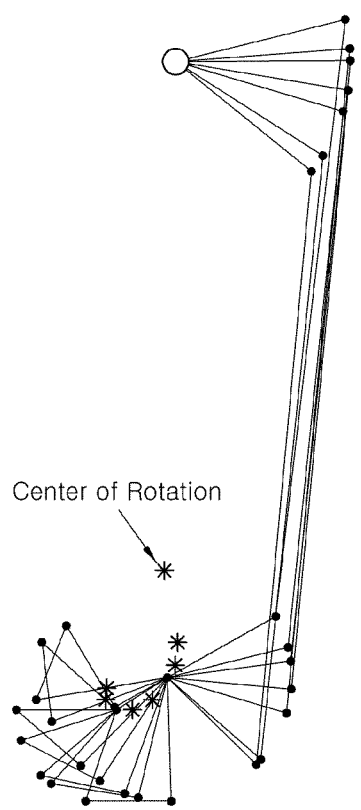
FIG. 6 is a conceptual view of the four-bar linkages illustrated in FIG. 5, in an overlapping manner.

FIG. 4 is a conceptual view illustrating two four-bar linkages provided in a knee joint part of the lower-limb exoskeleton robot illustrated in FIG. 1, FIG. 5 sequentially illustrates the operation of the four-bar linkages illustrated in FIG. 4, according to the angles of the knee, and FIG. 6 is a conceptual view illustrating the plurality of views, illustrated in FIG. 5, in an overlapping manner.

As illustrated in FIGS. 4 to 6, the lower-limb exoskeleton robot according to an embodiment of the present disclosure is configured such that the two four-bar linkages F1 and F2 are connected. The two four-bar linkages F1 and F2 of the lower-limb exoskeleton robot according to an embodiment of the present disclosure are designed to realize the movement of a real human knee, i.e. a polycentric movement in which anterior/posterior translation and flexion-extension are associated.

According to a plurality of studies, when the knee flexion angle of a leg (i.e., an angle defined between an extension of a thigh and a shank) is less than 15°, the center of rotation of the shank is higher than the anatomical knee joint, and the possibility that the center of rotation of the shank remains in the spontaneous stability area increases. It is also known that, when the knee flexion angle is increased to be 15° or more, the center of rotation is displaced downwards and backwards, so that the center of rotation moves out of the spontaneous stability area.

The structure of the lower-limb exoskeleton robot according to an embodiment of the present disclosure is designed such that the first four-bar linkage F1 acts as a powertrain to transfer torque from the driving shaft to the second four-bar linkage F2, and the second four-bar linkage F2 realizes a polycentric knee movement (i.e. a movement in which the center of rotation of the thigh varies). That is, the first four-bar linkage F1 acts to transfer the torque of the driving shaft, generated by the driving unit, while the second four-bar linkage F2 acts to allow the knee to rotate using the torque of the driving shaft transferred thereto.

When the driving device (such as a motor or an actuator) providing torque to the driving shaft is located closer to the body than to the knee of the robot user, the moment of inertia of the leg can be reduced. A reduction in the moment of inertia of the leg, i.e., an increase in the mechanical bandwidth of the leg, is an essential requirement in designing a high-speed leg movement. As described above, the first four-bar linkage F1 for transferring torque generated by the driving unit to the second four-bar linkage F2 can be embodied by connecting the arm of the actuator, i.e. the movable driving arm 13 connected to the driving shaft, and the second four-bar linkage F2 using the first auxiliary link 14, instead of locating the driving unit close to the body of the user. In summary, the role of the first four-bar linkage F1 is to allow the actuator to be located closer to the body of the user in order to reduce the total moment of inertia of the leg while transferring the torque of the actuator to the shank link 16 so that the knee can move.

The second four-bar linkage F2 is a key element for embodying a polycentric knee structure. A point illustrated as being separated from the links, in FIGS. 5 and 6, indicates the center of rotation of the shank link 16 at specific angles of the knee. As illustrated in FIGS. 5 and 6, when the angle of the knee is equal to or less than 15°, the center of rotation is formed at a position higher than the knee (i.e., points at which the first four-bar linkage F1 and the second four-bar linkage F2 are connected to each other). When the angle of the knee exceeds 15°, the center of rotation is formed at a position below and backward of points at which the first four-bar linkage F1 and the second four-bar linkage F2 are connected to each other.

Figure 7:
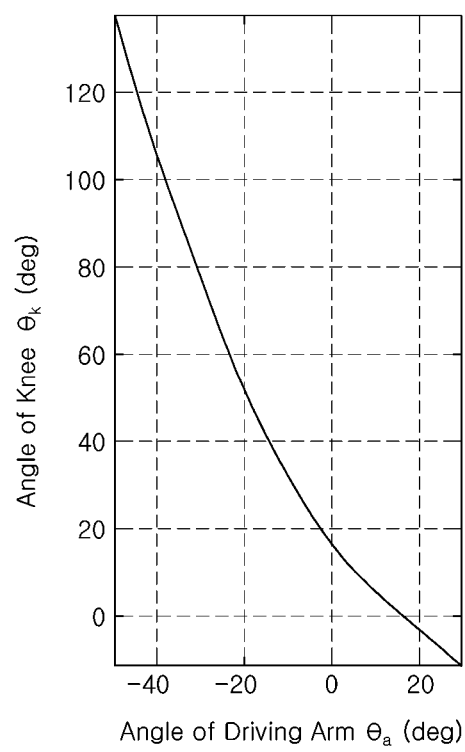
FIG. 7 is a graph illustrating the relationship between an angle of rotation of a driving arm and a knee joint in the lower-limb exoskeleton robot illustrated in FIG. 1, driven by a driving unit.
Figure 8:
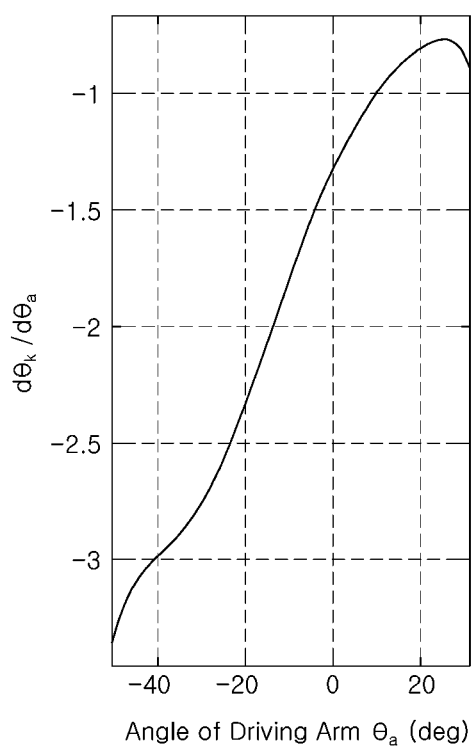
FIG. 8 is a graph illustrating rotational angular velocities of the driving arm driven by the driving unit of the lower-limb exoskeleton robot illustrated in FIG. 1 and resultant ratios of the angle of the knee joint with respect to velocities.

FIG. 7 is a graph illustrating the relationship between the angle of rotation of the driving arm and the knee joint in the lower-limb exoskeleton robot illustrated in FIG. 1, driven by the driving unit, and FIG. 8 is a graph illustrating the rotational angular velocities of the driving arm driven by the driving unit of the lower-limb exoskeleton robot illustrated in FIG. 1 and the resultant ratios of the angle of the knee joint with respect to the velocities.

A function of mapping from the angle of rotation $\theta_a$ of the driving arm 130 to the angle of the knee joint $\theta_k$ due to the operation of the driving unit can be analytically derived as in Formula 1, using a fixed point-based cosine function provided by a computer-aided design (CAD) application program or the like, and the relationship thereof is illustrated in FIG. 7. That is, setting about the lengths and connection relationship of the two four-bar linkages F1 and F2 can be analyzed using the CAD application program, thereby deriving a mapping function as represented in Formula 1.

As illustrated in FIG. 4, the angle of rotation $\theta_a$ of the driving arm 13 may mean an angle of the driving arm 13 with respect to a plane P' passing through the driving shaft x. The actual angle $\theta_k$ of the knee may mean an angle of the lower bar, formed by the shank link 16 of the second four-bar linkage F2, with respect to the plane P. This is identical to the relative angle defined between the shank link 16 and the thigh link 12, i.e. the angle of the knee. The two angles, i.e. the angle of rotation $\theta_a$ of the driving arm 13 and the angle $\theta_k$ of the knee, indicate the mechanical relationship in which the first four-bar linkage F1 and the second four-bar linkage F2 are connected in series. A relationship function of the two angles may be expressed by Formula 1. That is, when the angle of rotation of the driving arm is known, the angle of the knee joint can be derived by Formula 1.

$$\theta_k = f(\theta_a) \qquad \text{[Formula 1]}$$

When the mapping function of Formula 1 is differentiated with respect to time, Formula 2 is derived. When both sides of Formula 2 are divided by $\dot{\theta}_a$, the angle change rate, i.e. the ratio of the speed of the angle of rotation of the driving arm and the speed of the angle of the knee, can be derived by Formula 3. The speed ratios thereof are represented in FIG. 8.

$$\dot{\theta}_k = \frac{df(\theta_a)}{d\theta_a}\dot{\theta}_a \quad \text{[Formula 2]}$$

$$\frac{\dot{\theta}_k}{\dot{\theta}_a} = \frac{df(\theta_a)}{d\theta_a} \quad \text{[Formula 3]}$$

The relationship illustrated in FIGS. 7 and 8 can be obtained by Formulas 2 and 3. As illustrated in FIGS. 7 and 8, the relationship between the change (i.e. speed) of the angle of the driving arm and the change (i.e. speed) of the angle of the knee caused by the change of the angle of the driving arm is variable instead of being fixed. For example, in a case in which a completely-extended knee (having an angle 0° in FIG. 7) is flexed to 10°, the corresponding angle of the driving arm can be referred to FIG. 8. When the speed ratio thereof is inspected, it can be appreciated that the rate (i.e. speed) of the angle of the knee is further increased (i.e. the change of the angle of the knee is further increased). Characteristics related to the speed ratio, as described above, mean that torque is enhanced and a load can be supported in a position in which the leg is extended and a rapid swing operation is possible in a position in which the leg is flexed.

In a case in which power generated by the driving unit is maintained by a gear train, as represented by Formula 4, the torque/speed caused by the driving unit can be calculated as represented in Formula 5.

$$\tau_k \dot{\theta}_k = \tau_a \dot{\theta}_a \quad \text{[Formula 4]}$$

$$\tau_a = \frac{\dot{\theta}_k}{\dot{\theta}_a}\tau_k = \frac{df(\theta_a)}{d\theta_a}\tau_k \quad \text{[Formula 5]}$$

In Formulas 4 and 5, $\tau_k$ is torque of the knee joint, $\tau_a$ is torque of the driving shaft, $\dot{\theta}_k$ is an angular speed of the knee joint, and $\dot{\theta}_a$ is an angular speed of the driving arm.

Figure 9:
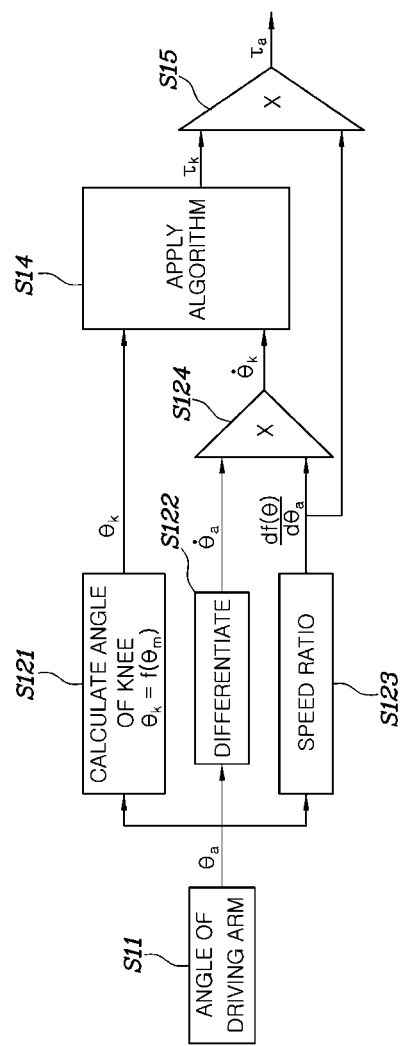
FIG. 9 is a block diagram illustrating a method of controlling a lower-limb exoskeleton robot according to an embodiment of the present disclosure.

FIG. 9 is a block diagram illustrating a method of controlling a lower-limb exoskeleton robot according to an embodiment of the present disclosure.

In the lower-limb exoskeleton robot according to an embodiment of the present disclosure, the knee joint does not include a driving unit, such as a motor or an actuator, but torque generated by a driving unit is transferred to the knee using the two four-bar linkages F1 and F2. In this case, the torque of the knee joint is not the same as the torque of the driving unit. This feature has been described above with reference to Formulas 4 and 5.

Accordingly, the lower-limb exoskeleton robot according to an embodiment of the present disclosure carries out S11 of detecting an angle $\dot{\theta}_a$ of the driving arm, S121 of deriving an angle $\theta_k$ of the knee using Formula 1, S122 of deriving an angular speed $\dot{\theta}_a$ of the driving arm by differentiating the angle of the driving arm, S123 of deriving the angle of the driving arm and the speed ratio $$\frac{df(\theta_a)}{d\theta_a}$$

of the knee angle using Formula 3, and S124 of deriving an angular speed $\dot{\theta}_k$ of the knee, as represented in Formula 2.

Subsequently, in S14, a torque $\tau_k$ of the knee is derived using the angle $\theta_k$ of the knee and the angular speed $\dot{\theta}_k$ of the knee, by applying a torque deriving algorithm using a typical single axis of rotation. In S15, torque of the driving unit, i.e. a torque $\tau_a$ for rotating the driving arm, is derived by applying the torque $\tau_k$ of the knee derived by Formula 5. In this manner, the driving unit can be controlled.

For example, the torque deriving algorithm applied in step S14 may be implemented as a torque deriving algorithm using a typical single angle of rotation. The torque deriving algorithm using a typical single angle of rotation is an algorithm of imparting the user with a knee torque derived based on a knee angle, an angular speed, other sensor information, and the like. In an embodiment of the present disclosure, the angle of the knee of the user is estimated to be the angle of the driving arm, and torque of the knee to be imparted to the user can be realized as torque of the driving unit. Thus, the control method according to an embodiment of the present disclosure illustrated in FIG. 9 calculates the angle and angular speed of the knee, which may be required in the torque deriving algorithm using a single axis of rotation, as the angle and speed of the driving arm. The torque of the driving arm can be determined based on the required torque derived by the torque deriving algorithm using a single axis of rotation. Thus, the torque deriving algorithm using a single axis of rotation can be easily used in step S14.

This control method can be performed by the controller 140 provided in the lower-limb exoskeleton robot according to an embodiment of the present disclosure.

In the lower-limb exoskeleton robot according to an embodiment of the present disclosure, as described above, the knee joint can perform a polycentric rotation as in real human bodies, so that a leg movement very similar to the movement of the leg of the user can be performed. It is possible to remove the problem in that the cuffs, disposed on the thigh, shin, and the like of the user to bring the robot into close contact with the user, are pushed, thereby making the exoskeleton robot more comfortable to wear.

In addition, the lower-limb exoskeleton robot according to a plurality of embodiments of the present disclosure can realize intrinsic stability to resist a ground reaction torque transferred through a sole when a heel touches the ground or a floor by temporarily changing the center of rotation during the rotation of the knee.

Furthermore, the lower-limb exoskeleton robot according to a plurality of embodiments of the present disclosure can displace the position of the driving unit, such as a motor or an actuator, to a location above the thigh link to reduce the moment of inertia of the leg of the exoskeleton robot. This can increase the mechanical bandwidth of the leg of the robot to be suitable for walking at a relatively high speed. In addition, a changeable torque ratio between the driving unit (shaft) and the knee joint allows the leg to support a load when extended and to rapidly swing when flexed.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:
1. A multi-bar linkage, comprising:
a driving unit supplying torque to a driving shaft;

a first link, wherein the driving shaft is provided on a first portion of the first link;
a driving arm having one side fixed to the driving shaft and an opposite side being movable following rotation of the driving shaft;
a first auxiliary link having one side pivotably connected to the opposite side of the driving arm;
a second auxiliary link pivotably connected to a first point of a second portion of the first link and pivotably connected to an opposite side of the first auxiliary link;
a second link disposed below the first link and pivotably connected to the second auxiliary link; and
a third auxiliary link having one side pivotably connected to a second point of the second portion of the first link, separated from the first point of the second portion of the first link, and an opposite side pivotably connected to the second link,
wherein the second auxiliary link has a contact surface, with which a lower side portion of the first link comes into contact, and the lower side portion of the first link slides on the contact surface when the driving shaft rotates, and
wherein the second auxiliary link comprises a guide forming the contact surface and a connecting portion fixed to one side of the guide, the connecting portion being pivotably connected to the first link and the first auxiliary link, and an opposite side of the guide being pivotably connected to the second link.

2. The multi-bar linkage according to claim 1, wherein the lower portion of the first link comprises a curved surface, and the contact surface comprises a surface concavely curved in a direction of the first link.

3. The multi-bar linkage according to claim 1, wherein the guide comprises roller bearings on the contact surface.

4. The multi-bar linkage according to claim 1, further comprising a controller controlling the driving unit by determining torque of the driving shaft based on an angle of rotation detected from the driving arm.

5. The multi-bar linkage according to claim 4, wherein the controller performs:
detecting the angle of rotation of the driving arm;
deriving an angle of a knee joint, as an angle between the first link and the second link corresponding to the detected angle of rotation of the driving arm, and a ratio between an angular speed of the knee joint and an angular speed of rotation of the driving arm, by applying a preset mapping function and a preset speed ratio, and deriving an angular speed of rotation of the driving art by differentiating the detected angle of rotation of the driving arm;
deriving an angular speed of the knee joint corresponding to the detected angle of rotation of the driving arm, using the ratio between the detected angular speed of rotation of the driving arm and the ratio between the angular speed of the knee joint and the angular speed of rotation of the driving arm;
deriving torque of the knee joint, as a torque of rotation of the second link based on the first link, using the derived angle of the knee joint and the derived angular speed of the knee joint; and
determining the torque of the driving shaft, using the derived ratio between the angular speed of the knee joint and the angular speed of rotation of the driving arm and the derived torque of the knee joint, and driving the driving unit to output the determined torque of the driving shaft.

6. The multi-bar linkage according to claim 5, wherein the mapping function is predetermined by a formula:

$$\theta_k = f(\theta_a),$$

where $\theta_a$ is the angle of rotation of the driving arm, and $\theta_k$ is the angle of the knee joint, and
the ratio between the angular speed of the knee joint and the angular speed of rotation of the driving arm is predetermined by differentiating and arranging both sides of the formula of the mapping function with respect to time so as to be expressed by a formula:

$$\frac{\dot{\theta}_k}{\dot{\theta}_a} = \frac{df(\theta_a)}{d\theta_a}.$$

7. The multi-bar linkage according to claim 6, wherein the controller determines the torque of the driving shaft by a torque calculation formula:

$$\tau_a = \frac{\dot{\theta}_k}{\dot{\theta}_a}\tau_k = \frac{df(\theta_a)}{d\theta_a}\tau_k,$$

wherein the torque calculation formula is determined, on an assumption that energy of the driving shaft is preserved as energy of rotation of the second link, by establishing an energy preservation formula:

$$\tau_k\dot{\theta}_k = \tau_a\dot{\theta}_a,$$

where $\tau_k$ is the torque of the knee joint, $\tau_a$ is the torque of the driving shaft, $\dot{\theta}_k$ is the angular speed of the knee joint, and $\dot{\theta}_a$ is the angular speed of the driving arm, and
dividing both sides of the energy preservation formula by the angular speed of the driving arm.

8. A method of controlling the multi-bar linkage as claimed in claim 1, the method comprising:
detecting the angle of rotation of the driving arm;
deriving an angle of a knee joint corresponding to the detected angle of rotation of the driving arm, as an angle between the first link and the second link corresponding to the detected angle of rotation of the driving arm, and a ratio between an angular speed of the knee joint and an angular speed of rotation of the driving arm, by applying a preset mapping function and a preset speed ratio, and deriving an angular speed of rotation of the driving art by differentiating the detected angle of rotation of the driving arm;
deriving an angular speed of the knee joint corresponding to the detected angle of rotation of the driving arm, using the derived ratio between the detected angular speed of rotation of the driving arm and the ratio between the angular speed of the knee joint and the angular speed of rotation of the driving arm;
deriving torque of the knee joint, as a torque of rotation of the second link based on the first link, using the derived angle of the knee joint and the derived angular speed of the knee joint; and
determining the torque of the driving shaft, using the derived ratio between the angular speed of the knee joint and the angular speed of rotation of the driving arm and the derived torque of the knee joint, and driving the driving unit to output the determined torque of the driving shaft.

9. The method according to claim 8, wherein the mapping function is predetermined by a formula:

$\theta_k = f(\theta_a)$, where $\theta_a$ is the angle of rotation of the driving arm, and $\theta_k$ is the angle of the knee joint, and the ratio between the angular speed of the knee joint and the angular speed of rotation of the driving arm is predetermined by differentiating and arranging both sides of the formula of the mapping function with respect to time so as to be expressed by a formula:

$$\frac{\dot{\theta}_k}{\dot{\theta}_a} = \frac{df(\theta_a)}{d\theta_a}.$$

10. The method according to claim 9, wherein the controller determines the torque of the driving shaft by a torque calculation formula:

$$\tau_a = \frac{\dot{\theta}_k}{\dot{\theta}_a}\tau_k = \frac{df(\theta_a)}{d\theta_a}\tau_k,$$

wherein the torque calculation formula is determined, on an assumption that energy of the driving shaft is preserved as energy of rotation of the second link, by establishing an energy preservation formula:

$\tau_k \dot{\theta}_k = \tau_a \dot{\theta}_a$, where $\tau_k$ is the torque of the knee joint, $\tau_a$ is the torque of the driving shaft, $\dot{\theta}_k$ is the angular speed of the knee joint, and $\dot{\theta}_a$ is the angular speed of the driving arm, and dividing both sides of the energy preservation formula by the angular speed of the driving arm.

11. A lower-limb exoskeleton robot, comprising:
a driving unit providing torque to a driving shaft;
a thigh link, wherein the driving shaft is provided on a first portion of the thigh link;
a driving arm having one side fixed to the driving shaft and an opposite side being movable following rotation of the driving shaft;
a first auxiliary link having one side pivotably connected to the opposite side of the driving arm;
a second auxiliary link pivotably connected to a first point of a second portion of the thigh link and pivotably connected to an opposite side of the first auxiliary link;
a shank link disposed below the thigh link and pivotably connected to the second auxiliary link;
a third auxiliary link having one side pivotably connected to a second point of the second portion of the thigh link, separated from the first point of the second portion of the thigh link, and an opposite side pivotably connected to the shank link; and
a controller controlling the driving unit by determining torque of the driving shaft based on an angle of rotation detected from the driving arm,
wherein the second auxiliary link has a contact surface, with which a lower side portion of the thigh link comes into contact, and the lower side portion of the thigh link slides on the contact surface when the driving shaft rotates,
wherein the second auxillary link comprises a guide forming the contact surface and a connecting portion fixed to one side of the guide, and
wherein the connecting portion is pivotably connected to the first link and the first auxillary link, and an opposite side of the guide is pivotably connected to the second link.

* * * * *